Patented July 2, 1935

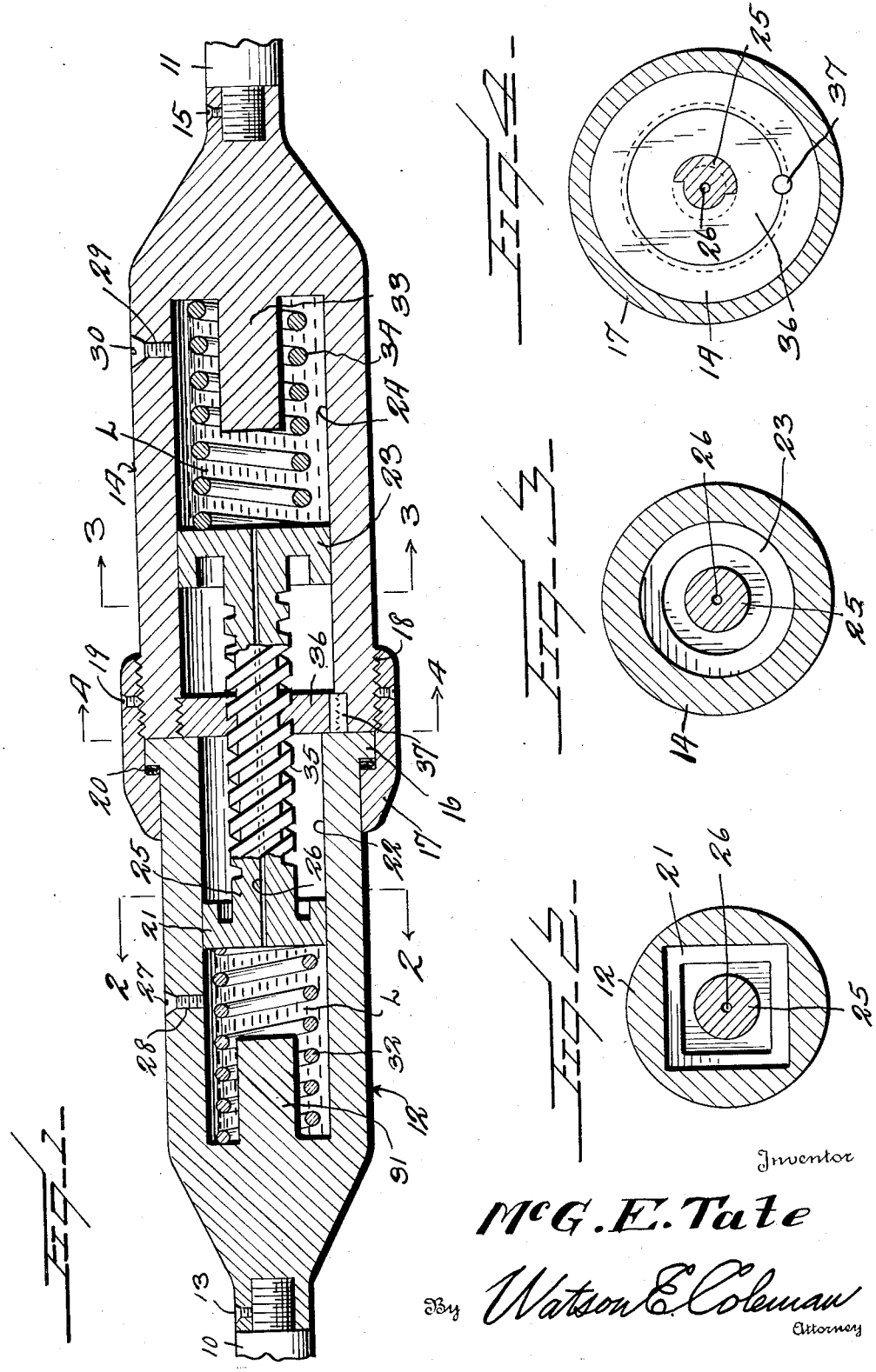

2,006,578

UNITED STATES PATENT OFFICE 2,006,578

TORSIONAL SHOCK ABSORBER

McGarvey E. Tate, Somerset, Ky.

Application September 14, 1933, Serial No. 689,475

3 Claims. (Cl. 64—96)

This invention relates to a shock absorbing means.

An object of this invention is to provide a shock absorbing means for a power or drive shaft so as to prevent jerking of the driven elements and thereby eliminate undue strain on these driven elements and also on the power or drive shaft.

Another object of this invention is to provide a cushioning means for a power shaft disposed between the driving element and the driven element so that either of these elements may be rotated to a degree relative to the other and the rotation of the elements relative to each other retarded by a suitable cushioning means which will gradually take hold, thereby eliminating the sudden rotation of one element by another.

The above and various other objects and advantages of this invention will in part be described and in part be understood from the following detailed description of the present preferred embodiment, the same being illustrated in the accompanying drawing wherein:—

Figure 1 is a longitudinal section partly in detail of a device constructed according to the preferred embodiment of this invention.

Figure 2 is a sectional view taken on the line 2—2 of Figure 1.

Figure 3 is a sectional view taken on the line 3—3 of Figure 1.

Figure 4 is a sectional view taken on the line 4—4 of Figure 1.

Referring to the drawing wherein like numerals of reference designate corresponding parts throughout the several views, the numeral 10 designates a drive shaft, and the numeral 11 designates diagrammatically a driven shaft or element. In order to cushion the shocks incident to the rotation of the shafts 10 and 11, I have provided a cylindrical member or housing 12, which is secured against rotation at one end to the drive shaft 10 as by a securing element 13. A second cylindrical member or housing 14 is secured as by a securing element 15 to the driven shaft or element 10, and the ends of the two housings 12 and 14 abut against each other. The drive housing 12 is provided at its outer end or the end confronting the housing 14 with an annular flange 16 and a flanged ring 17 is secured as by threads 18 and a securing element 19 to the inner end of the housing 14 and loosely engages about the flange 16.

The flanged ring 17 is rotatable on the periphery of the housing 12 inwardly of the flange 16 and a thrust or cushioning member 20 is interposed between the flanged side of the ring 17 and the inner side of the flange 16.

The housing 12 is preferably hollow and a piston 21 is slidable therein and, in the present instance, the piston 21 is secured against rotation within the bore 22 of the housing 12 by providing an angular or rectangular shaped bore 22. The housing 14 has a piston or plunger 23 slidable in a bore 24 provided in this housing and, in the present instance, the bore 24 is round so that the piston or plunger 23 is not only slidable in this bore but is also rotatable.

The piston or plunger 21 is connected to the piston or plunger 23 by means of a connecting rod or bar 25, and this connecting member 25 has a bleeder bore 26 therethrough, which opens at one end through the piston 21 and at the other end through the piston or plunger 23. In this manner, movement longitudinally in the two housings of the pistons 21 and 23 is permitted and the flow of liquid or air from one compression chamber to another is controlled, there being a partial vacuum in one chamber and compression in the other. That portion of the space between the inner end of the plunger 21 and the inner end of the bore 22 comprises a compression chamber and a liquid in the form of oil or the like L may be disposed in this compression chamber. In the same manner, the bore 24 constitutes a compression chamber and the space between the inner end of the plunger 23 and the inner end of the bore 24 is adapted to be filled with a liquid or may be filled with air, and as the floating lock and cushioning member comprising the pistons 21 and 23 and the connecting member 25 moves in the cylinders, the liquid will flow through the bleeder opening from one cylinder through the bleeder opening 26 into the other cylinder.

The cylinder or housing 12 has a threaded opening through the wall thereof communicating with the bore 22 and a screw plug 27 closes this filler opening 28. The cylinder housing 14 is also provided with an opening 29 communicating with the bore 24 and this filler opening is closed by a screw plug 30.

The cylinder 12 is provided on the inner end thereof with an abutment 31 about which a spring 32 is disposed, and when this spring 32 is compressed under the action of the plunger or piston 21, the convolutions of the spring will be substantially disposed between the inner end of the cylinder 12 and the outer end of the abutment 31. This spring 32 constantly urges the piston or plunger 21 outwardly The cylinder 14 has an abutment 33 similar to the abutment 31 and a coil spring 34 is disposed about this abutment 33 and engages against the inner side of the piston 23 and constantly urges this piston 23 outwardly against the tension of the spring 32. Under the action of the springs 32 and 34, the two pistons or plungers 21 and 23 will normally be disposed when the shafts 10 and 11 are stationary at substantially the central point between the two cylinders or casings 12 and 14. The connecting link or bar 25 connecting the pistons 21 and 23 together is provided with threads 35 which engage a nut member or head 36 threaded into the inner end of the casing 14. A key 37 holds this head 36 against rotation when it is in desired position in the cylinder 14.

In the use and operation of the shock absorbing means hereinbefore described, when the drive shaft 10 is initially rotated, the piston or plunger 21 will be rotated therewith and under the action of the rotation of the drive shaft 10, the piston 21 through the medium of the threaded connecting member 25 will be moved longitudinally of the bore 22. This movement can be in either direction but is preferably in the direction of the outer end of the cylinder 12 so as to move the piston 23 toward the abutment 33. As the piston 23 moves inwardly against the tension of the spring 34, the liquid or air within the compression chamber will flow through the bleeder opening 26 into the enlarging chamber between the piston 21 and the inner end of the bore 22. As the drive shaft 10 is rotated, the driven shaft 11 will pick up gradually and will be rotated at the same speed as the drive shaft 10 when the piston 23 contacts with the abutment 33.

It will, of course, be understood that the shock absorbing means will operate equally as well by reversal of the driving operation, that is, the driven shaft 11 will force the piston 23 away from the abutment 33 and the piston 21 against the abutment 31 when the torsional strain on the shaft 11 is greater than the torsional strain on the shaft 10. This device may, therefore, be used on a drive shaft for any power means and when used on the drive shaft of the motor vehicle, the device is interposed intermediate the length of the shaft.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A torsional shock absorbing device comprising a pair of alined and abutting cylinders, means for swivelly securing the abutting ends of the cylinders together, one of said cylinders having a round and smooth inner surface and the other of said cylinders having a polygonal and smooth inner surface, a round piston slidable in said one cylinder, a polygonal piston slidable in said other cylinder, a plate provided with an axial threaded opening secured in the inner end of one of said cylinders, a threaded connecting member secured to each of said pistons and engaging through the opening in the plate, said connecting member having an axial opening therethrough and said pistons each having an axial opening communicating with the opening in the connecting member, and a liquid in said cylinders and movable from one cylinder to the other through said openings upon movement of the pistons in the cylinders.

2. A torsional shock absorbing device comprising a pair of alined and abutting cylinders, means for swivelly securing the abutting ends of the cylinders together, one of said cylinders having a round and smooth inner surface and the other of said cylinders having a polygonal and smooth inner surface, a round piston slidable in said one cylinder, a polygonal piston slidable in the other cylinder, a plate carried by one of the cylinders and provided with an axial threaded opening, a threaded connecting member fixed to each of said pistons and threadably extending through the plate, said connecting member having an axial opening therethrough and said pistons having an axial opening communicating with the opening in the connecting member, a liquid in said cylinders and movable from one cylinder to the other through said openings upon movement of the pistons in the cylinders and a pair of springs, one in each cylinder engaging against a piston to constantly urge the pistons toward the abutting ends of the cylinders.

3. A torsional shock absorbing device comprising a pair of alined and abutting cylinders, means for swivelly securing the abutting ends of the cylinders together, one of said cylinders having a round and smooth inner surface and the other of said cylinders having a polygonal and smooth inner surface, a round piston slidable in said one cylinder, a polygonal piston slidable in the other cylinder, a plate carried by one of the cylinders and provided with an axial threaded opening, a threaded connecting member fixed to each of said pistons and threadably extending through the plate, said connecting member having an axial opening therethrough and said pistons having an axial opening communicating with the opening in the connecting member, a liquid in said cylinders and movable from one cylinder to the other through said openings upon movement of the pistons in the cylinders, and a pair of abutments secured one within each cylinder and disposed interiorly of a portion of each spring whereby to limit the movement of the pistons.

McGARVEY E. TATE.